(12) United States Patent
Goode et al.

(10) Patent No.: US 6,391,985 B1
(45) Date of Patent: May 21, 2002

(54) HIGH CONDENSING MODE POLYOLEFIN PRODUCTION UNDER TURBULENT CONDITIONS IN A FLUIDIZED BED

(75) Inventors: Mark Gregory Goode; Mark Williams Blood, both of Hurricane, WV (US); William George Sheard, Houston, TX (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/422,458

(22) Filed: Oct. 21, 1999

(51) Int. Cl.$^7$ .................................................. C08F 2/34
(52) U.S. Cl. .............................. 526/70; 526/59; 526/61; 526/68; 526/72; 526/351; 526/352; 526/348
(58) Field of Search ............................ 526/59, 61, 70, 526/68, 72, 351, 352, 348

(56) References Cited

U.S. PATENT DOCUMENTS

| | | | |
|---|---|---|---|
| 3,627,129 A | 12/1971 | Hartmann et al. | 209/474 |
| 3,931,134 A | 1/1976 | Hartmann et al. | 260/93.7 |
| 4,543,399 A | 9/1985 | Jenkins, III et al. | 526/70 |
| 4,547,616 A | 10/1985 | Avidan et al. | 585/640 |
| 4,588,790 A * | 5/1986 | Jenkins, III et al. | 526/70 |
| 4,746,762 A | 5/1988 | Avidan et al. | 585/415 |
| 4,827,069 A | 5/1989 | Kushnerick et al. | 585/415 |
| 5,352,749 A | 10/1994 | Dechellis et al. | 526/68 |
| 5,405,922 A | 4/1995 | Dechellis et al. | 526/68 |
| 5,436,304 A | 7/1995 | Griffin et al. | 526/68 |
| 5,462,999 A | 10/1995 | Griffin et al. | 526/68 |
| 5,698,642 A | 12/1997 | Govoni et al. | 526/65 |
| 5,712,352 A | 1/1998 | Brent et al. | 526/68 |
| 5,712,353 A | 1/1998 | Poirot et al. | 526/88 |
| 5,733,510 A | 3/1998 | Chinh et al. | 422/143 |
| 5,804,677 A | 9/1998 | Chinh et al. | 526/68 |

OTHER PUBLICATIONS

Cai et al "Effect of Operating Temperature and Pressure on the Transition from Bubbling to Turbulent . . . " AIChe Symposium—Fluidization and Fluid . . . No. 270, v. 85 p. 37, 1989.

Lee and Kim "Pressure Fluctuations in Turbulent Fluidized Beds" Journal Chem Eng. (Japan) v. 21, No. 5 (1988), 515.

Cai, Jin, Yu, and Wang "Mechanism of Flow Regime Transition from Bubbling to Turbulent Fluidization" AIChe Journal, vol. 36, No. 6 (Jun. 1990), 955.

Rhodes "What is Turbulent Fluidization?" Powder Technology v. 88 (1996) pp 3–14.

Chehbouni, Chaouk, Guy and Kivan "Characterization of the Flow Transition between Bubbling and Turbulent Fluidation" Ind. Eng. Chem. Res 1994, 33, p. 1889–1896.

Burdett, Eisinger, Cai and Lee "Recent Developments in Fluidized–Bed Process for Olefin Polymerization" AIChE paper.

Bai, Chibuyz, Nakagzwa–Kato "Characterization of Gas Fluidization Regimes using Pressure Fluctuations" Powder Technology 87 (1996) 105–111.

Al–Zahrani, Dadus "Bed Expansion and Average Bubble Rise Velocity in a Gas–Solid Fluidized Bed" Powder Technology 87 (1996) 225–227.

Sinclair, Kenneth B. "Third Generation Polyolefin Technologies and Their Capabilities" SPE Polyolefins IX International Conference Feb. 26, 1995.

* cited by examiner

Primary Examiner—David W. Wu
Assistant Examiner—William Cheung

(57) ABSTRACT

A fluidized bed olefin polymerization process is operated in the turbulent regime while utilizing greater than 17.5% liquid in the recycle fluid to remove the heat of reaction. The ratio of fluidized bed density to settled bed density may, contrary to prior art predelictions, be maintained at lower than 0.59.

20 Claims, 5 Drawing Sheets

HIGH CONDENSING MODE POLYOLEFIN PRODUCTION UNDER TURBULENT CONDITIONS IN A FLUIDIZED BED

TECHNICAL FIELD

This invention relates to the production of polymers in fluidized beds, particularly in fluidized bed processes for the polymerization of olefins, adjusted to operate turbulently to facilitate high levels of liquid in the recycled fluid.

BACKGROUND OF THE INVENTION

The production of polyolefins in fluidized beds requires that the heat of reaction be removed in order to maintain appropriate temperatures for the desired reaction rate. In addition, the temperature of the vessel cannot be permitted to increase to the point where the product particles become sticky and adhere to each other. The heat of reaction is commonly removed by circulating the gas from the fluidized bed to a heat exchanger outside the reactor and passing it back to the reactor.

The earliest such recycle systems were based on the assumption that it would be inefficient, or inoperable, to cool the recirculating gas below its dew point so that liquid would be introduced into the reactor through the recycle process. However, operation in the "condensing mode" has become quite common in the art—see Jenkins U.S. Pat. Nos. 4,543, 399 and 4,588,790. In accordance with the teachings of these patents, an inert liquid may be introduced into the recycle stream to increase its dew point. The resulting ability to remove greater quantities of heat energy in less time has increased the production capacity of the typical exothermic fluidized bed reactor.

More recently, in U.S. Pat. Nos. 5,352,749, 5,405,922, and 5,436,304 (see column 12, lines 4–17), higher levels of liquid have been shown to be practical. Griffin et al, in U.S. Pat. No. 5,462,999, observe a range of bulk density functions Z, which include dependence on temperature, pressure, particle characteristics and gas characteristics. As in the Griffin et al '999 patent, which is incorporated by reference, we refer herein to the bulk density function Z, defined (col. 12, lines 38–47 of Griffin '999 and col. 12, lines 31–42 of Griffin et al U.S. Pat. No. 5,436,304) as $$Z = \frac{(p_{bf} - p_g)/p_{bs}}{(p_s - p_g)/p_s}$$

where $p_{bf}$ is the fluidized bulk density, $p_{bs}$ is the settled bulk density, $p_g$ is the gas density and $p_s$ is the solid (resin) density. The bulk density function Z can be calculated from process and product measurements.

Fluidized bulk density (FBD), and particularly the ratio of fluidized bulk density to settled bulk density (SBD), are asserted to be limiting factors for stable operation where higher quantities of liquid are used in the recycle stream. DeChellis and Griffin, in U.S. Pat. No. 5,352,749 (also incorporated in its entirety by reference) place an upper limit of 5.0 feet per second (1.5 m/sec) on the superficial gas velocity ("SGV") within the reactor—see column 8, lines 31–33. The various perceived limits on operating conditions have inhibited workers in the art from increasing the level of liquid in the recycle stream and from venturing into the realm of turbulence in the fluidized bed. DeChellis and Griffin, in U.S. Pat. No. 5,352,749, maintain the ratio of FBD/SBD above 0.59 (col. 4, line 68), stating "as a general rule a reduction in the ratio of FBD to SBD to less than 0.59 may involve risk of fluidized bed disruption and is to be avoided." (Col. 5, lines 10–12).

Govoni et al, in U.S. Pat. No. 5,698,642 (col. 2, line 40), refer to the "turbulence" generated by the grid (distributor plate) which distributes the liquid into the bed of polymer in the DeChelllis et al '749 patent, but this is not turbulence as defined (see below) in turbulent fluidization. Unlike the present invention, Govoni et al operate under fast fluidization conditions.

Definition of the Turbulent Regime

There are at least five different fluidization regimes. In order of increasing gas velocity (U) or decreasing solids concentration, they are particulate fluidization (for group A particles only), bubbling fluidization, turbulent fluidization, fast fluidization, and pneumatic transport. Gupta and Berruti also describe "dense phase conveying," a fluidization regime that qualitatively can be considered an extension of the turbulent regime where there is no dilute freeboard above the bed as is common in olefin polymerization, resulting in high solids carryover at the top of the fluid bed reactor. Gupta and Burruti, Fluidization IX, 1998, p. 205. We include dense phase conveying in the definition of turbulent fluidization for purposes of our invention.

A turbulent regime is not simply a regular dense bed of bubbling fluidization regime having substantial freeboard activities. The turbulent regime has distinct features differing from those of the bubbling and fast fluidization regimes. Most available models and correlations developed for bubbling fluidization regimes or fast fluidization regimes cannot be applied for turbulent fluidization regimes.

The mean amplitude of pressure fluctuations in the fluidized bed has been observed as having a noticeable downturn as the superficial gas velocity increased to a certain point. The peak mean amplitude fluctuation was taken as the velocity for the beginning of a transition to turbulent fluidization, and denoted $U_c$. See Lee, G. S. and Kim, S. D., Journal Chemical Engineering (Japan) vol. 21, No. 5 (1988), 515. $U_c$ is defined as the velocity at which amplitude of pressure fluctuations peak. We note that it marks the transition from the bubbling regime to the turbulent regime, and accordingly we sometimes call it herein the transition velocity. In addition to the amplitude of pressure fluctuations, characteristic indicia of pressure fluctuation intervals, standard deviation of pressure fluctuation, skewness and flatness of pressure fluctuations, and power spectral density function of pressure fluctuations may also be observed at $U_c$ according to Lee and Kim. However, their correlation of the Archimedes Number to the critical Reynolds Number for turbulence is not applicable to pressurized fluid bed polymerization. The velocity at which the mean amplitude of pressure fluctuations level off as the gas velocity is increased beyond $U_c$ is defined as $U_k$, as will be illustrated herein in FIG. 3. We take the appearance of $U_k$ as marking the termination of turbulent fluidization and the onset of fast fluidization, as the superficial gas velocity increases.

The structure of a fluidized bed changes when the gas velocity exceeds $U_c$. The most important difference is in the bubble behavior. Specifically, the bubble interaction is dominated by bubble coalescence at gas velocities smaller than $U_c$, while it is dominated by bubble break-up at gas velocities greater than $U_c$ (e.g., Cai et al., "*Effect of Operating Temperature and Pressure on the Transition from Bubbling to Turbulent Fluidization*", AIChE Symposium Series—Fluidization and Fluid Particle Systems—Fundamentals and Application, No. 270, v. 85 page 37, 1989; *Characterization of the Flow Transition between Bubbling and Turbulent Fluidization*" by Ahmed Chehbouni, Jamal Chaouki, Crisstopher Guy, and Danilo Klvana, Ind. Eng. Chem. Res. 1994, 33, 1889–1896. The bubble/void size in the turbulent regime tends to decrease with the increase of gas velocity due to the predominance of bubble break-up over bubble coalescence. This trend is opposite to that in the bubbling regime. Thus, with sufficiently high gas velocity, bubble/void size can be reduced to an order of magnitude similar to the particle size. This high gas velocity, called the transition velocity, demarcates the diminishing of bubbles in the turbulent regime and a gradual transition to lean-phase bubble-free fluidization. As a result of the dominant break-up tendency of bubbles/voids, more small bubbles/voids with relatively low rise velocities and longer residence time exist in turbulent systems, which leads to a more significant dense bed expansion than that in the bubbling regime, and therefore a lower fluid bed density. Bubbles/voids in the turbulent regime are less regular in shape compared with those in bubbling beds. At relatively high gas velocities in the turbulent regime, the clear boundary of bubbles/voids disappears and the non-uniformity of solids concentration distribution yields gas voids which become less distinguishable as the gas velocity further increases towards fast fluidization.

Govoni et al, in U.S. Pat. No. 5,698,642, define "fast fluidization" as the state obtained "when the velocity of the fluidizing gas is higher than the transport velocity, and it is characterized in that the pressure gradient along the direction of transport is a monotonic function of the quantity of injected solid, for equal flow rate and density of the fluidizing gas." The patent continues (column 5, lines 20–30) "Contrary to the present invention, in the fluidized-bed technology of the known state of the art, the fluidizing-gas velocity is maintained well below the transport velocity, in order to avoid phenomena of solids entrainment and particle carryover. The terms transport velocity and fast fluidization are well known in the art."

Some features of the turbulent regime different from those of a bubbling regime are as follows:
  i) Bubbles/voids still exist, with a predominant tendency of break-up. Their sizes are small and decrease with the increase of gas velocity. Bubbles split and reorganize frequently, and often appear in more irregular shapes.
  ii) Bubbles/voids move violently, rendering it difficult to distinguish the emulsion (continuous) and bubble/void (discrete) phases in the bed.
  iii) Dense phase expands significantly with an expansion ratio (ratio of fluidized bed height to still bed height) greater than that of a bubbling regime. The upper surface of the bed exists, but becomes more diffused with large particle concentration in the freeboard.
  iv) Bubble motion appears to be more random with enhanced interphase exchange and hence intimate gas-solid contact and high beat and mass transfer.

Persons conversant with the art of fluidized beds started to accept a more or less refined definition of the "turbulent" fluidization regime around the mid-1980's. This evolved definition recognizes the "turbulent" fluidization regime as a unique operation range which starts at about $U > U_c$ and covers at least a major part of $U_c < U < U_k$. Because of its substantial structural difference from bubbling regime and intensive application background, this definition for "turbulent" regime has gained substantial acceptance in the world fluidization community. Nevertheless, at least until recently, workers in the art have not been particularly consistent or precise in their use of the term "turbulent fluidization" in a fluidized bed. See the critique of a number of other papers: "What is Turbulent Fluidization" by Martin Rhodes, *Powder Technology* 88 (1996) 3–14. However, it is now generally accepted that turbulence is achieved when a significant portion of the bubbles begin to lose their shape near the top of the bed, and a turbulent motion of clusters and voids of gas of various sizes and shapes appears. As the superficial gas velocity is increased, the onset of turbulence is associated with a critical superficial gas velocity, commonly called the transition velocity. See Cai et al, supra. The authors provide a plot of the mean amplitude of pressure fluctuations against the gas velocity in fluidized beds, showing the bubbling regime and the turbulent regime clearly separated by the "critical superficial gas velocity," $U_c$. The critical superficial gas velocity appears at a peak; as the plot proceeds into the turbulent regime, the mean amplitude of pressure fluctuations recedes. See also Chehbouni et al, supra. On the other end of the regime, turbulence yields to fast fluidization when the bubbles and voids are diminished in size to the same order of magnitude of the solid particles. See Avidan, U.S. Pat. Nos. 4,547,616 and 4,746,762, and Kushnerick et al U.S. Pat. No. 4,827,069, all incorporated herein by reference because of their description of turbulence in fluidized beds. Thus we use "turbulence", "turbulent", and "turbulent fluidization" to mean the state of a fluidized bed existing between the conditions of (1) the presence of discernable bubbles and (2) fast fluidization, and/or the regime of conditions between (a) the transition velocity $U_c$ and (b) the transport velocity $U_k$, expressed as the superficial gas velocity—see the Avidan U.S. Pat. No. 4,746,762 patent at column 7, lines 65–68, for example.

It is recognized that turbulent fluidization might not exist homogeneously across the vertical dimension of the bed. Turbulent fluidization may begin at the top of the bed and move progressively lower as the superficial gas velocity increases. It is thought that turbulent fluidization aids in the mixing of liquid and polymer particles in the region of the bed near the distributor plate, and the presence of turbulent fluidization at or near the distributor plate is therefore preferred to other isolated areas of turbulence. For our purposes in this invention, turbulent fluidization is meant to include a zone of turbulent fluidization in the bottom, middle or top of the fluid bed, as well as a turbulent regime throughout the bed as described above.

SUMMARY OF THE INVENTION

Our invention is a method of achieving and utilizing a high percentage of liquid in the recycle in order to remove heat from the recycle at a faster rate, thus enabling a faster production rate. We achieve a high percentage of liquid in the recycle by deliberately adjusting the conditions in the reactor to pass from the bubbling mode of fluidization to turbulent fluidization and increasing the condensing level (the amount of liquid introduced through recycle) to a desired level of 17.5% or higher, preferably 20% or higher, as will be explained further herein. We maintain operation in the turbulent regime—that is, we do not increase the gas velocity to $U_k$ or beyond.

Although, as indicated above, it is accepted and valid to define turbulence as a regime between (1) that in which there are discernable bubbles, the bubbling regime, and (2) fast fluidization, we believe a more precise and objective definition is the regime between $U_c$ and $U_k$ as explained above. While our invention is useful and operable throughout the entire range between discernable bubbles and fast fluidization, our preferred regime is that between a superficial gas velocity (SGV) of $1.01 \times U_c$ and the onset of fast fluidization, or $U_k$, and the most preferred regime, or range of operation, is that between $1.1 \times U_c$ and $0.9 \times U_k$.

Preferably, we utilize a ratio of fluidized bulk density to settled bulk density (FBD/SBD) less than 0.59, more preferably in the range of 0.2:1 to 0.58:1, most preferably in the range 0.4 to 0.55, together with a high percentage of recycle liquid—that is, at least 17.5% by weight—preferably 20% to 90%, more preferably 20% to 50%. Our low fluidized bulk density results in a low ratio of fluidized bulk density to settled bulk density. We are able to use a low fluidized bulk density together with a high liquid recycle rate because we operate in the turbulent condensing mode. While the defining characteristic of the turbulent mode we use is the range of SGV described above, we also prefer that the FBD/SBD ratio be maintained less than 0.59:1, preferably 0.4 to 0.58.

DESCRIPTION OF THE INVENTION

Figure 1:
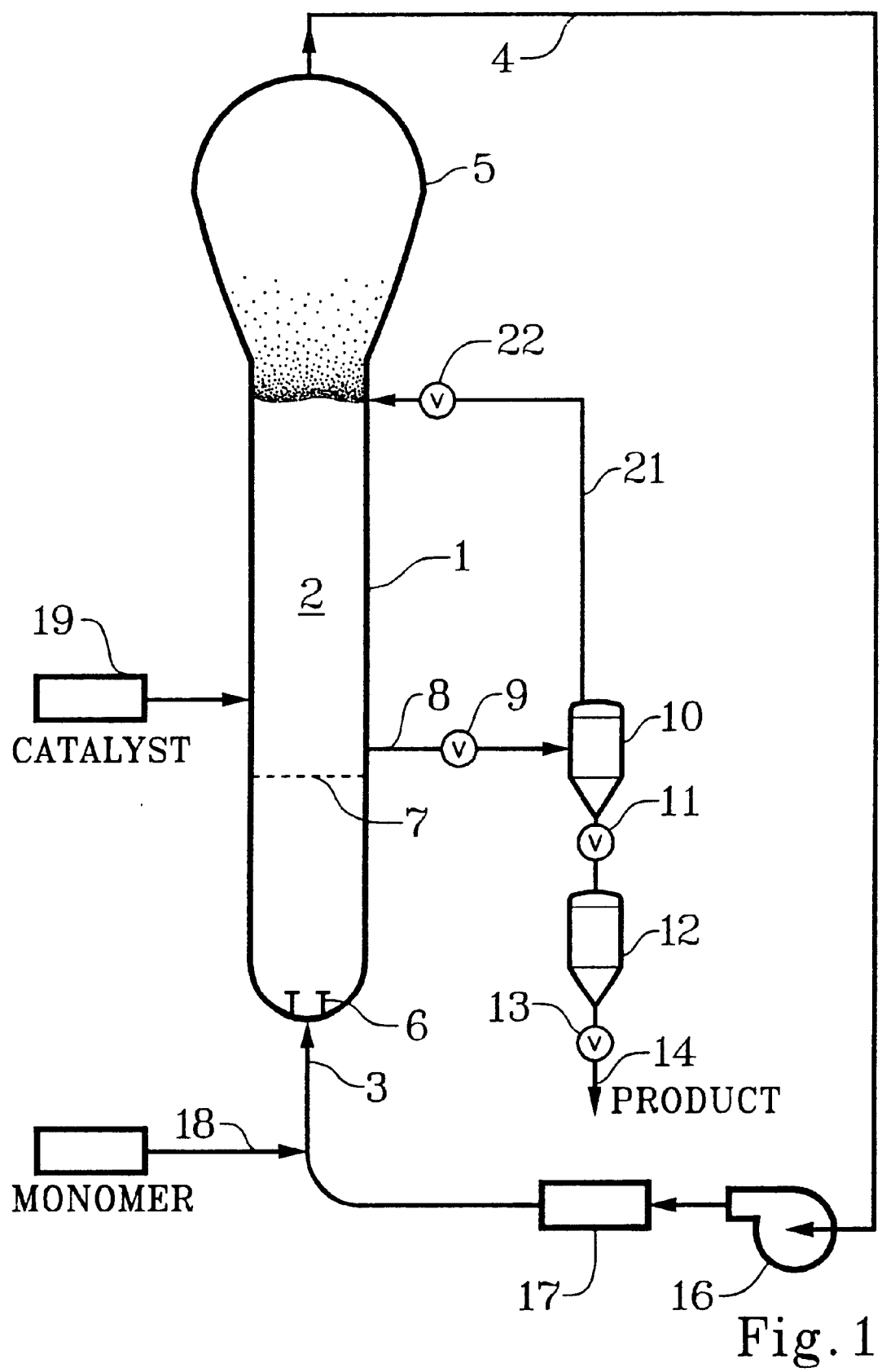
FIG. 1 is a schematic of a typical fluidized bed reactor for making polyolefins in the condensing mode.

Referring first to FIG. 1, the depicted preferred commercial reactor, shown more or less diagrammatically, has a straight section 1 and an expanded section 5. Within the straight section 1 is a fluidized bed 2 of particulate polyolefin product made by polymerizing monomer introduced with makeup materials through line 3 from source 18, and the introduction of catalyst from source 19, all as known in the art. Recycle line 4 more or less continuously removes fluid from expanded section 5. The fluid is passed through compressor 16 and condenser 17 to remove the thermal energy originating as the heat of reaction from the exothermal polymerization process in straight section 1. The fluid is recycled through line 3 to deflector 6 and distribution plate 7 into the fluidized bed 2, along with makeup material from source 18. Particulate product is removed continuously or intermittently through line 8, controlled by valve 9, into discharge tank 10, from which it may be removed in stages to minimize monomer loss through valve 11, tank 12 and valve 13, all as known in the art. Makeup material from source 18 may include not only fresh monomer, but inert liquid or other condensable materials introduced to assist in the heat removal process as is known in the art.

Figure 2:
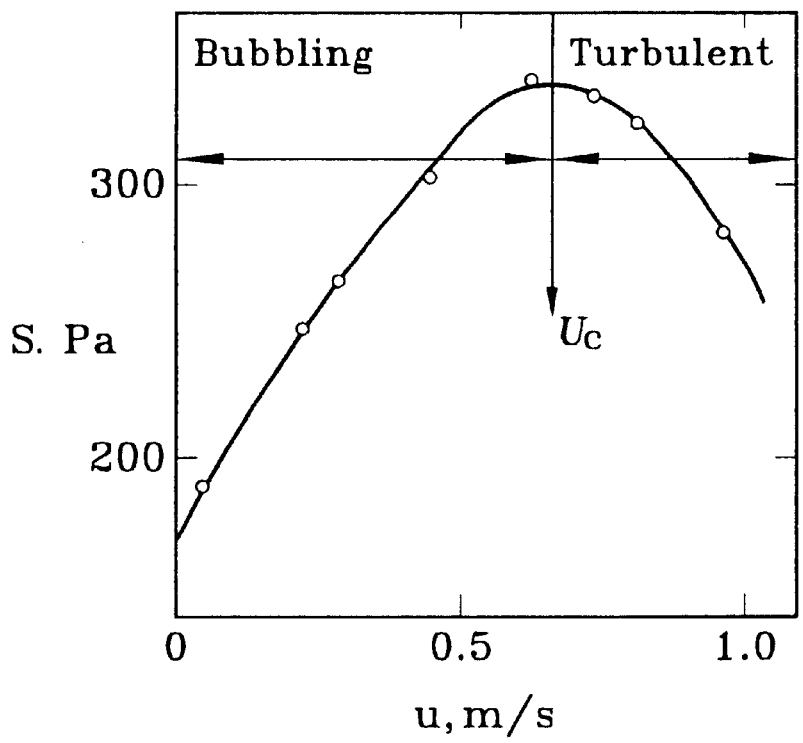
FIG. 2 is a typical superficial gas velocity curve in the area of $U_c$, the lower limit of the turbulent regime.

Referring now to FIG. 2, the plot shows the standard deviation of pressure fluctuation S against gas velocity U. The transition velocity $U_c$ marks the boundary between bubbling and turbulent regimes. This plot is reproduced from FIG. 3 in the above cited paper by Cai et al. As they noted, the specific gas velocity will vary with temperature and other factors, but $U_c$ may be relied on as the harbinger of turbulence as the superficial gas velocity increases.

Figure 3:
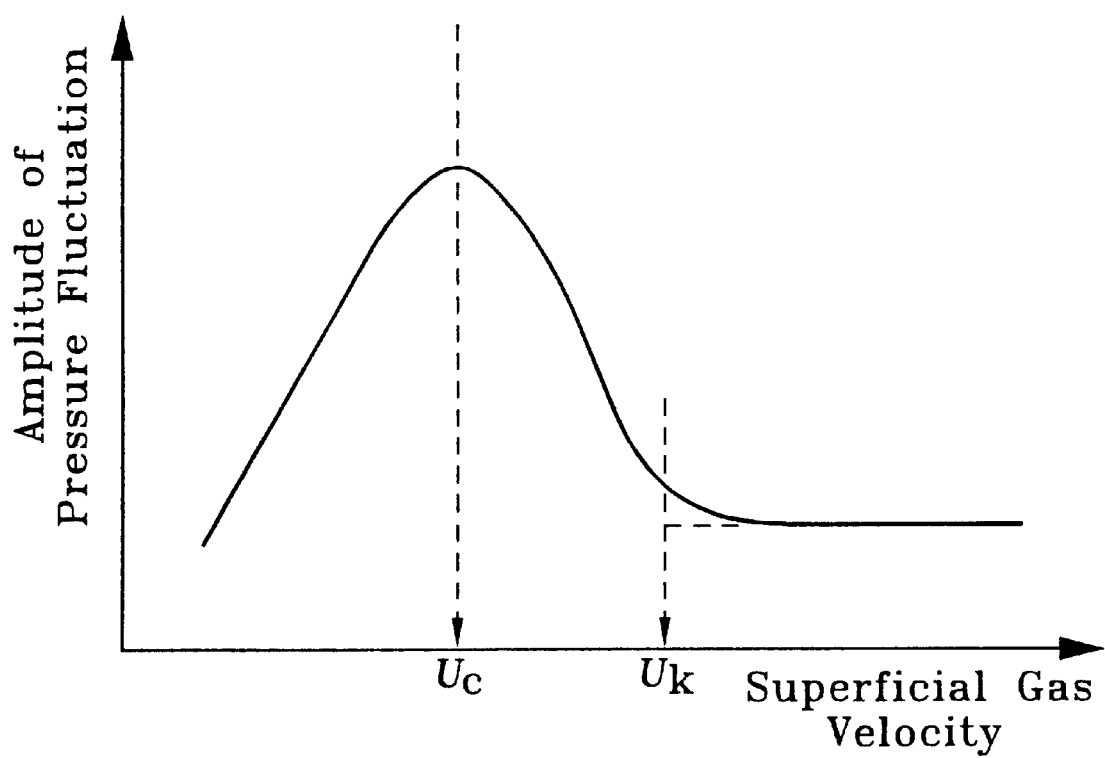
FIG. 3 is an idealized curve showing the upper and lower limits of turbulence, $U_c$ and $U_k$.

In FIG. 3, it is seen that carrying the data further will reveal another gas velocity, $U_k$, which marks the end of turbulence and the beginning of fast fluidization. This more or less idealized plot is reproduced from Fan, L. S. and Zhu, C. "Principles of Gas-Solid Flows", Cambridge 1998, p 397.

Our invention includes adjusting the fluidization conditions to operate the fluid bed in turbulent fluidization, and adjusting the cycle gas composition so that the condensing level is at least 17.5 wt %—that is, so that the fluid in line 3 entering the reactor is at least 17.5% liquid. The order of performing these steps is not material, although we prefer to establish turbulent conditions first and then increase the condensing level. Other adjustments may be made to the temperature, dew point of the recycle stream, reactor pressure, production rate and cycle gas velocity to maintain the liquid level at at least 17.5% by weight of the recycle stream while maintaining turbulent conditions in the reactor.

A further statement of our invention incorporates a method of conducting an exothermic olefin polymerization reaction in a fluidized bed comprising maintaining turbulent conditions therein while removing the heat of reaction by recycling fluid from the fluidized bed, the recycled fluid containing at least 17.5% liquid after cooling and condensing.

Yet another statement of our invention is that it is a process for polymerizing alpha-olefin(s) in a gas phase reactor having a fluidized bed and a fluidizing medium wherein the fluidizing medium serves to control the cooling capacity of the reactor, the process comprising employing in the fluidizing medium a level of liquid entering the reactor which is greater than 17.4 weight percent based on the total weight of the fluidizing medium and wherein the superficial gas velocity is at least at the transition velocity and is below the transport velocity, and the ratio of the resin fluidized bulk density to the settled bulk density is less than 0.59.

Stated another way, our invention includes increasing the condensing level to at least 17.5% by weight by the addition of one or more condensing agents to the reactor, and then or simultaneously transitioning the reactor to turbulent fluidization conditions. We recognize that there is a correspondence between the increased level of condensing agent and turbulent fluidization in that the density of the cycle gas increases as the amount of condensing agent increases. This lowers the $U_c$ value for the onset of turbulent fluidization. It may be desirable to push through the transition period relatively quickly so that the bed is substantially within the turbulent fluidization regime in order to avoid resin agglomeration.

The bed may be transitioned (in either direction) between turbulent and bubbling fluidization by effecting changes to cycle gas density, changes to superficial gas velocity, changes to gas composition, changes to gas total pressure, and changes to reaction temperature. Increasing the gas velocity decreases the required condensing level for a fixed production rate. Increasing the amount of condensing agent increases the temperature of the cooling gas at a fixed resin production rate and constant gas velocity. Increasing the total pressure of the cooling gas at a fixed resin production rate increases the temperature at constant velocity. Therefore, some of the changes to reaction conditions to achieve turbulent fluidization also tend to decrease the amount of condensing at fixed resin production rates. To compensate, resin production rates may be adjusted to higher values as the reactor is transitioned to turbulent conditions. Decreasing the reaction temperature is one method to increase the amount of condensing at otherwise fixed conditions.

Our invention is not limited to the above summaries. It may tolerate and/or include numerous variations in operating factors and conditions, as discussed below.

Superficial Gas Velocity

As indicated above, the superficial gas velocity (SGV) in our invention is between $U_c$ and $U_k$, preferably between $1.1U_c$ and $0.9U_k$. Typical ranges of SGV may include 0.4 to 8 ft/sec, and more preferably the range of about 0.7 to 6 ft/sec. It is recognized that resin particle size, resin particle density, gas density and gas viscosity all have a role in determining the superficial gas velocity $U_c$ required for turbulent fluidization. The ratio of the superficial gas velocity to minimum fluidization velocity is typically in the range of about 2 to 20 and more preferably in the range of about 3 to 10. The superficial gas velocity minus the minimum fluidization velocity is typically greater than about 0.3 ft/sec., more preferably greater than about 0.7 ft/sec., and most preferably greater than at least about 0.9 ft/sec.

In calculating the superficial gas velocity, it should be recognized that a variant or gradient may exist in the region of the fluid bed at and just above the distributor plate due to the presence of a large fraction of condensed liquid. With, for example, 20% by weight of the cycle gas condensed, the superficial gas velocity directly above the plate is 80% of its value higher in the bed after the liquid vaporizes. Thus, the apparent gas velocity above the plate may be below the critical transition velocity to turbulent fluidization. Yet, experience has shown this not to be disruptive to fluidization, in part due to the intensive mixing that occurs near the distributor plate and also due to the momentum and density of the liquid/gas mixture. The upper limit of superficial gas velocity may extend to 10, 20, or 30 ft/sec if transport velocity is not exceeded such as may be the case for large, dense resin particles fluidized with a low density gas. As the transport velocity is approached, there is a sharp increase in the rate of particle carryover, and in the absence of solid recycle, the bed could empty quickly.

In spite of the effects on superficial gas velocity of variations in other conditions in the bed, the onset of turbulence may be determined as a practical matter as superficial gas velocity increases by monitoring the mean amplitude of pressure fluctuations to determine a peak followed by a downturn, as illustrated in FIG. 2.

Fluidized Bulk Density; Settled Bulk Density; Their Ratio

The settled bulk density of the resin may range from about 5 to 50 lb/ft$^3$ more typically from about 10 to 40 lb/ft$^3$ and most typically from about 15 to 35 lb/ft$^3$.

It has been observed that the settled bulk density of the resin may increase as the amount of condensing increases. In one polypropylene homopolymer test, for example, the settled bulk density increased from 17.5 lb/ft$^3$ at 8 wt % condensing, to 19.5 lb/ft$^3$ at 10 wt % condensing, and finally to 21 lb/ft$^3$ at 11.5 wt % condensing. It was also observed that a slightly increased amount of hydrogen was required to maintain the same polymer molecular weight as the condensing level increased. Typical fluidized bulk density in the practice of this invention may vary from about 1 to 33 lb/ft$^3$, more typically from about 5 to 24 lb/ft$^3$ and most typically from about 7 to about 21 lb/ft$^3$.

While our basic invention comprises using a recycle fluid containing at least 17.5% liquid after cooling and condensing, and conducting the polymerization reaction in the turbulent mode, as indicated above, it is advantageous also to maintain a ratio of fluidized bulk density to settled bulk density in the range of 0.02:1 to 0.58:1. Preferably the FBD/SBD ratio will be in the range 0.3 to 0.58, more preferably 0.4 to 0.58, and most preferably 0.50 to 0.58, while maintaining turbulent fluidization conditions.

It is contemplated that the operator may learn to manipulate the liquid level in the process as its characteristics evolve. For example, a change in resin morphology or size, or in gas velocity or density, may influence a change in the FBD/SBD ratio, thus changing the optimum amount of liquid recycle. Such variations are within our invention so long as the basic parameters of turbulence and minimum liquid level are maintained.

Monomers; Polymers Made

Non-limiting examples of polymers that may be prepared using our invention include polyethylene, polypropylene, copolymers of ethylene and propylene with other alpha olefins and diolefins, ethylene-propylene rubbers including those containing dienes, polyvinyl acetate, polystyrene and polybutadiene.

Catalysts; Their Addition; Fines

Any olefin polymerization catalyst may be used in the practice of this invention. The catalyst may be added as a solid, slurry or solution, and may be supported on an inorganic or organic support. The catalyst may be a prepolymer. The catalyst may be conveyed into the reactor with a gas, liquid or gas/liquid mixture including for example gaseous ethylene, nitrogen, cycle gas and propane, or liquid propane, propylene, isopentane and liquified cycle gas condensed in the recirculation loop. In particular, use of slurry or solution catalyst with and without liquid conveying into the reactor, or the conveying of solid catalysts with liquid conveying in the reactor, reduces the fines carryover out the top of the reaction system. The catalyst may be added into the turbulent region of the fluid bed. The presence of liquid condensing agent in the bed may likewise reduce fines carryover, and the height that the catalyst is added to the reactor may be adjusted such that the amount of fines entrained in the recirculating gas is reduced. Addition of catalyst lower in the reactor in or close to the region that is penetrated by the condensed liquid may reduce the fines carryover. Addition of catalyst higher in the reactor or above the zone that liquid penetrates may increase the fines content.

Condensing Agents

Propylene monomer may be used as a condensing agent as well as a raw material when polypropylene is being manufactured. Polypropylene homopolymers can be so prepared as well as copolymers with other comonomers, such as for example, random copolymers of ethylene-propylene and/or butene-propylene. Alternative condensing agents may be added to the polypropylene process, non-limiting examples of which include propane, butane, pentane, isopentane and hexane. These agents may be used with homopolymers or random copolymers, and are especially useful during the production of propylene-butene random copolymers. This is because the propylene concentration must be decreased markedly as the butene concentration increases in order to insure good reactor operation and granular resin flowability. The decreased propylene results in a lower dewpoint of the cycle gas (even though more butene is present), and the use of a non-polymerizing agent makes up for that loss. The ICA's (induced condensing agents) are added at levels to facilitate condensing in the range of about 17.5 to 90 wt % condensing. There may be upper limitations on liquid content that are product dependent. For example, inherently less crystalline resins such as propylene-butene copolymer will typically tolerate higher levels of C3 than C4 than C5 ICA. Isopentane, for example, tends to dissolve into the resin and soften it and is less useful for condensing. Propane, on the other hand, although added in great quantity, does not greatly dissolve and soften the resin and is an excellent tool for operating at high condensing levels.

Our invention can also be utilized in polyethylene production where the added condensing agent chosen will preferably have a molecular weight in the range of 42 to 100, preferably from 42 to 60. Exemplary condensing agents within this range are the C3 and C4 alkanes as well as propylene and butene.

The C3 and C4 ICA's are added at levels for condensing in the range of about 17.5 to 90 percent by weight of the recycle fluid. Our preferred ranges of inert condensing agents are about:

Propane 5 to 90 mole percent, preferably 10 to 85 mole percent;

Butane 5 to 90 mole percent, preferably 10 to 75 mole percent;

Isopentane 1 to 90 mole percent, preferably 5–70 mole percent;

Hexane 1 to 90 mole percent, preferably 3 to 65 mole percent.

As is known in the art, two or more condensing agents may be used together. As an example, isopentane may be added at a level that does not cause undue resin stickiness, and propane may be added to further increase the amount of condensing as well as to increase the heat capacity of the cycle gas. Propane may prevent resin agglomeration in the fluid bed in regions not penetrated by liquid. Propane may also aid in the removal of heavier hydrocarbons during the resin degassing process after product removal.

Introducing and Recycling the Recycle Fluid and Condensing Agent

The method of introducing the condensing agent may vary. For example, it may be introduced as a gas or a liquid, together with the monomer or a comonomer, through line 3 or a separate line to distribution plate 7, alone or together with other additives for the process such as inert solids, hydrogen, catalyst and/or cocatalyst.

The recycled fluid may also be introduced directly into the fluidized bed 2 through the wall of straight section 1 or by means of a conduit passing directly through distributor plate 7 (see U.S. Pat. No. 5,804,677). It may be divided or split into two or more streams having the same or differing ratios of liquid to gas.

Cooling and Condensing the Recycle Fluid

The method of cooling, condensing and reintroducing the recycle stream to the fluid bed may vary. Multiple or single heat exchange coolers in the recirculation line may be used in series or parallel. Water may be used as the cooling medium, and refrigeration can be employed to increase the amount of cooling. The blower that recirculates the recycle stream around the loop may be located before, after or in between the coolers. The partially condensed recycle stream may be split into two parts, one containing mainly liquid and one containing mainly gas, and the two streams introduced separately into the fluid bed. The separate gas or liquid streams may be further heated, cooled, compressed, pumped or condensed prior to reintroduction to the fluid bed as is known in the art. The liquid can be sprayed into the reactor using an assist gas that may be the cycle gas. The polymerization catalyst can be added to the reactor with the condensed liquid recycle stream introduced separately into the fluid bed while operation under turbulent fluidization conditions with the advantage that the catalyst is better dispersed and localized hot spotting of the catalyst is reduced relative to such operation in bubbling fluidization.

Reactor Configuration; Fines Handling

The reactor can assume any configuration known to be operable in the prior art for the condensing mode. The fluid bed of polymer particles can be any practical height, ranging from 1 or 2 feet for a small pilot reactor to about 20 to 150 feet for development and commercial reactors. The diameter of the reactor can range from about 0.2 to 30 feet such that the aspect ratio of the height to diameter is within the range of about 1:1 to 12:1, more preferably about 2:1 to 8:1. Fine resin particles may be present in the bed, possibly due to attrition of particulate product or due to a fines fraction in the catalyst added to the reactor. The fines may become entrained in the recycle gas stream. A typical turbulent bed may have a resin carryover rate up to about 5 to 10 times the reaction zone inventory per hour, but preferably less than about 1.5 times the reaction zone inventory per hour. If the fraction of resin and/or catalyst fines becomes large, the gas velocity or the gas density may be decreased in order to reduce the amount of resin carryover. It is feasible to have a fine particle separator, such as a cyclone and/or filter means, disposed within or outside the reactor shell to recover resin carryover and return this fraction continuously or semi-continuously to the top, middle or bottom of the reaction zone for recirculation. The fines fraction may also be removed from the reaction system using a fine particle separator or by selectively discharging resin from the top portion of the fluid bed. Means may also be provided to reduce or eliminate fines carryover by the use of baffles in or above the fluid bed, baffles or blowers at the entrance to the cycle gas recirculation loop at the top of the reactor, a lengthy disengaging section above the fluid bed, an expanded section in the freeboard above the bed to reduce the gas velocity, the addition and distribution of liquid hydrocarbon in the upper 50% of the bed height, especially in the upper 30% of the bed height or the addition and distribution of liquid hydrocarbon into the freeboard above the bed to wet the surface of the fluid bed, to wet entrained particles, or to spray the internal reactor surfaces. The liquid hydrocarbon added may be a feedstream or mixture, such as, for example, propylene, propane, butene, butane, isopentane, pentene-1, hexane or hexene-1. It may also be part or all of the liquid separated from the cycle gas condensed in the recirculation loop, preferably about 0.2 to 50% of the liquid condensed in the cycle gas loop, more preferably about 1% to 30% of the liquid condensed.

Means may also be provided to assure that the recirculation of a large amount of resin fines does not foul the recirculation loop or the gas/liquid distribution means below the fluid bed. It is one aspect of the present invention that operation at high condensing levels tends to wash or scrub the internals of the recirculation loop and gas/liquid distribution means below the fluid bed such that fouling is greatly reduced or mitigated. Operation at high levels of condensing may also reduce the amount of fines carryover.

The fluid bed may include a mechanical internal mixer. The walls of the fluid bed reactor may be vertical or sloped, expanding inwards or outwards as the height increases. It may be of cylindrical, conical or rectangular shape. It may include a disengaging section that may be the same or different shape as the reactor body.

The cross sectional area of the fluid bed may be smaller at the bottom than at the top, such that the superficial gas velocity at the bottom of the bed is in the turbulent regime and superficial gas velocity higher in the bed is in the bubbling regime, so that some or all of the condensed liquid is vaporized in the lower turbulent mixing section prior to entering the upper bubbling section. The advantage of such a process is that high levels of condensing can be tolerated while maintaining a relatively high fluidized bulk density in part of the bed and without excessive fines carry-over. The reactor cross-sectional area may expand gradually or stepwise with vertical, horizontal or sloped sections. Reactor configurations which may be useful for such multilevel processes are described in U.S. Pat. Nos. 3,627,129 and 3,931,134, incorporated herein by reference.

Shape; Morphology of Product

Generally, it may be expected that the less spherical the resin particle, the broader the turbulent fluidization region. Even though decreased sphericity of the resin particle may aid in achieving turbulent fluidization, it is recognized that sphericity, or lack thereof, may also affect the maximum allowable concentration of condensing agent and/or the maximum level of condensing when operating in turbulent fluidization. The use of nearly spherical resin particles is anticipated by this invention, as well as resins of increasingly poorer morphology. The more spherical resin particles may be expected to tolerate higher levels of condensing agent and/or higher levels of condensing than the resins of poorer morphology. More irregular shaped particles in some instances may perform better at high condensing due to less interparticle adhesion arising from the condensation of condensing agent at interfaces. Resin particles with settled and fluidized void fractions in the range of about 0.05 to 0.97 are acceptable for the practice of this invention, preferably in the range of about 0.1 to 0.9, and most preferably in the range of 0.2 to about 0.85.

Resin particles having internal voids will favor turbulent fluidization, as the particles are less dense than those without voids. Many methods are known in the art for producing resins with internal void fractions, such as manipulation of the catalyst support, changes to the catalyst loading or the use and adjustment to the concentration of chemical agents and modifiers on the catalyst. Our invention is compatible with such techniques.

Particle Size and Size Distribution

It is desirable to operate the process with particles that will mix well throughout the bed. Large particles should be avoided, as they tend to fluidize as in the bubbling mode, thus in effect tending to convert the regime from turbulent to bubbling. The desired upper limit of the resin particle size that insures turbulent fluidization is a complex function of many factors including, for example, the superficial gas velocity, the gas density, the gas velocity, the temperature, total pressure, gas composition, particle shape, porosity and apparent density. Particle size distribution also, particularly the presence of a significant amount of fines, can reduce the transition velocity to turbulent fluidization. Accordingly, the resin particle size may vary between about 0.003 to 0.50 inch, more preferably from about 0.005 to 0.10 inch. The turbulent fluidization regime is controlled to assure operation between the transition velocity and transport velocity. Fluidization conditions are substantially different from those found in non-turbulent dense beds or transport beds.

Thus persons skilled in the art may manipulate various conditions and factors of the process, depending on the peculiarities of the particular facility, the product to be made, the available condensing agents, other additives, and numerous other process conditions and objectives. Our invention enables the operator to achieve very high heat removal rates, and hence high production rates, through a great variety of combinations of conditions, compositions of the fluidized bed, and superficial gas velocities in the turbulent regime. Most importantly, our invention accommodates very high percentages of recycle liquid without the types of difficulties from turbulence that may have been predictable from the prior art.

EXAMPLES

These examples demonstrate that stable operation can be achieved in a gas phase, turbulent mixing fluidized bed polymerization reactor at conditions deemed inoperable by the prior art. In the examples, the Z function is calculated as recited above and as by Griffin et al in U.S. Pat. No. 5,436,304 (col. 12, lines 31–42) and U.S. Pat. No. 5,462,999 column 12, lines 38–47. The ratio of fluidized bulk density (FBD) to settled bulk density (SBD) is also calculated in a manner consistent with that of DeChellis et al in U.S. Pat. No. 5,352,749. The resin particle size, fluidized and settled bulk densities are based on experimental evaluation of catalyst performance at similar reaction conditions. Conditions in Examples 1, 2, and 5 certainly comprise turbulent fluidization, and Examples 3 and 4 are likely also in turbulent fluidization.

As indicated above, one may monitor the mean amplitude of pressure fluctuations along with superficial gas velocity as it is increased, and determine that turbulence as defined herein has been achieved when the mean amplitude of pressure fluctuations ceases to increase and a plot of it takes a downturn.

Example 1

A polypropylene homopolymer is prepared in a gas phase fluidized bed reactor under the conditions outlined in Table 1. The catalyst is of the Ziegler-Natta $TiCl_3$ type on a magnesium chloride support slurried in mineral oil. An aluminum alkyl activator and a selectivity control agent are also added to the reaction system. The total reactor pressure is 500 psia, the propylene partial pressure is 390 psia, the cycle gas dew point is 66.4° C., and the cycle gas density is 4.8 $lb/ft^3$. The resin production rate is 83,592 lb/hr at an STY (space time yield) of 13 $lb/hr/ft^3$ operating at a condensing level of 41 wt %.

The resin fluidized bulk density is 7.5 $lb/ft^3$ and the settled bulk density is 18.3 $lb/ft^3$. The FBD/SBD ratio is 0.41, well below the minimum 0.59 FBD/SBD ratio proposed by DeChellis in U.S. Pat. No. 5,352,749 for stable reactor operation. The Z-function is 0.16, well below the calculated minimum operable Z-function value of 0.45. The bed is in turbulent fluidization.

Example 2

A propylene-ethylene random copolymer is prepared in a gas phase fluidized bed reactor under the conditions outlined in Table 1. The catalyst system is the same as that described in Example 1. The total reactor pressure is 500 psia, the propylene partial pressure is 300 psia, the ethylene partial pressure is 15 psia and 25 mole % of propane is present in the reaction system. The cycle gas dew point is 64.5 C. and the cycle gas density is 4.64 $lb/ft^3$. The resin production rate is 83,592 at an STY of 13 $lb/hr/ft^3$ while operating at a condensing (liquid) level of 31.8 wt %.

The resin fluidized bulk density is 8.0 $lb/ft^3$ and the settled bulk density is 14.9 $lb/ft^3$. The FBD/SBD ratio is 0.54, a few units below the minimum 0.59 FBD/SBD ratio proposed in DeChellis U.S. Pat. No. 5,352,749 for stable reactor operation. The Z-function is 0.25, well below the calculated minimum operable Z-function value of 0.44. The bed is in turbulent fluidization.

Example 3

An ethylene homopolymer is prepared in a gas phase fluidized bed reactor under the conditions outlined in Table 1. The catalyst system is of the Ziegler-Natta $TiCl_3$ type, supported with magnesium chloride and aluminum alkyl compounds on a porous silica support. The catalyst is added as a dry powder to the reactor. An aluminum alkyl activator is added separately to the reactor. The total reactor pressure is 400 psia, the ethylene partial pressure is 120 psia and 50 mole % of n-butane is present in the reaction system. The cycle gas dew point is 85.2 C. and the cycle gas density is 2.7 lb/ft$^3$. The resin production rate is 96,453 at an STY of 15 lb/hr/ft$^3$ while operating at a condensing level of 27.8 wt %.

The resin fluidized bulk density is 11.8 lb/ft$^3$ and the settled bulk density is 25.2 lb/ft$^3$. The FBD/SBD ratio is 0.47, well below the minimum 0.59 FBD/SBD ratio proposed by De Chellis et al for stable reactor operation. The Z-function is 0.38, well below the calculated minimum operable Z-function value of 0.47. The bed is anticipated to be in turbulent fluidization.

Example 4

A polypropylene homopolymer is prepared in a gas phase fluidized bed reactor under the conditions outlined in Table 1. The catalyst system is of the metallocene type based on zirconium and supported on silica with an aluminoxane cocatalyst. The catalyst is added as a mineral oil slurry to the reactor. The total reactor pressure is 500 psia, the propylene partial pressure is 300 psia and 27 mole % of propane is present in the reaction system. The cycle gas dew point is 65.5 C. and the cycle gas density is 4.77 lb/ft$^3$. The resin production rate is 83,592 at an STY of 13 lb/hr/ft$^3$ while operating at a condensing level of 18.8 wt %.

The resin fluidized bulk density is 14.3 lb/ft$^3$ and the settled bulk density is 28.1 lb/ft$^3$. The FBD/SBD ratio is 0.51, which is below the minimum 0.59 FBD/SBD ratio proposed De Chellis for stable reactor operation. The Z-function is 0.37, which is below the minimum operable Z-function value of 0.395 calculated according to Griffin et al, U.S. Pat. No. 5,462,999. The bed is anticipated to be in turbulent fluidization.

Example 5

A polypropylene homopolymer is prepared in a gas phase fluidized bed reactor under the conditions outlined in Table 1. The catalyst system is of the metallocene type based on zirconium and an aluminoxane cocatalyst. The catalyst is not supported and is added as an atomized solution to the reactor. The total reactor pressure is 500 psia, the propylene partial pressure is 110 psia and 60 mole % of propane is present in the reaction system. The cycle gas dew point is 64.7 C. and the cycle gas density is 4.08 lb/ft$^3$. The resin production rate is 83,592 at an STY of 13 lb/hr/ft$^3$ while operating at a condensing level of 18.9 wt %.

The resin fluidized bulk density is 4.0 lb/ft$^3$ and the settled bulk density is 22.8 lb/ft$^3$. The FBD/SBD ratio is 0.18, well below the minimum 0.59 FBD/SBD ratio proposed by De Chellis for stable reactor operation. The Z-function is a negative 0.004, well below the minimum operable Z-function value of 0.395 calculated according to Griffin et al U.S. Pat. No. 5,462,999. The bed is in turbulent fluidization.

TABLE 1

Examples of Stable Reactor Operation at High Condensing Levels

| Example<br>Catalyst | 1<br>Z/N<br>Supported | 2<br>Z/N<br>Supported | 3<br>Z/N<br>Supported | 4<br>Metallocene<br>Supported | 5<br>Metallocene<br>Solution |
|---|---|---|---|---|---|
| Reaction Temperature, C | 67 | 67 | 102 | 67 | 80 |
| Reactor Total Pressure, psia | 500 | 500 | 400 | 500 | 500 |
| % Propylene | 78 | 60 | 0 | 60 | 22 |
| % Propane | 11.5 | 25 | 0 | 27 | 60 |
| % Hydrogen | 3 | 2 | 9 | 0.5 | 1 |
| % N2 | 7.5 | 10 | 11 | 12.5 | 17 |
| % Ethylene | 0 | 3 | 30 | 0 | 0 |
| Superficial Gas Velocity, ft/sec | 1.2 | 1.4 | 2.2 | 2.6 | 1.5 |
| Dew Point, C | 66.4 | 64.5 | 85.2 | 65.5 | 64.7 |
| Gas Density, lb/ft3 | 4.8 | 4.64 | 2.7 | 4.77 | 4.08 |
| Gas Viscosity, cP | 0.0131 | 0.0131 | 0.0137 | 0.0132 | 0.0127 |
| Space-Time-Yield, lb/hr/ft3 | 13 | 13 | 15 | 13 | 13 |
| Production Rate, lb/hr | 83592 | 83592 | 96453 | 83592 | 82592 |
| Weight % Condensing | 41 | 31.8 | 27.8 | 18.8 | 18.9 |
| Fluidized Bulk Density, lb/ft3 | 7.5 | 8 | 11.8 | 14.3 | 4.0 |
| Settled Bulk Density, lb/ft3 | 18.3 | 14.9 | 25.2 | 28.1 | 22.8 |
| Polymer Resin Density, g/cc | 0.89 | 0.89 | 0.965 | 0.89 | 0.89 |
| Polymer Resin Density, lb/ft3 | 55.6 | 55.6 | 60.2 | 55.6 | 55.6 |
| Resin Wt. APS, in. | 0.022 | 0.026 | 0.025 | 0.033 | 0.007 |
| FBD/SBD Ratio | 0.41 | 0.54 | 0.47 | 0.51 | 0.18 |
| Prior Art Min SBD/SBD Ratio | 0.59 | 0.59 | 0.59 | 0.59 | 0.59 |
| X Function | 3.08 | 3.20 | 3.13 | 3.58 | 2.62 |
| Y Function | 5.31 | 5.43 | 5.35 | 6.02 | 3.88 |
| Z Function | 0.16 | 0.25 | 0.38 | 0.37 | −0.004 |
| Prior Art Min. Operable Z Func | 0.45 | 0.44 | 0.47 | 0.395 | 0.30 |
| Anticipated Fluidization | Turbulent | Turbulent | Turbulent | Turbulent | Turbulent |
| Prior Art Op. Prediction | Inoperable | Inoperable | Inoperable | Inoperable | Inoperable |

Example 6

This example demonstrates the transition between fluidization regimes as observed on a commercial reactor.

A butene-propylene random copolymer was prepared in a gas phase fluid bed polymerization reactor having a diameter of about 12 feet, a bed height of about 30 feet and bed weight of about 44,000 pounds using a titanium trichloride catalyst on a magnesium chloride support added to the reactor as a mineral oil slurry conveyed by propylene monomer. Triethyl aluminum was used as cocatalyst and n-propyl trimethoxysilane was the promoter. The polymerization temperature was about 60° C. The reactor initially was producing propylene homopolymer, and butene-1 was introduced at selected rates over about a period of 130 hours to produce products containing about 7, 12.5, and 14 wt % butene. Due to the increased softening of the resin as the butene content increased, and due to the increase of butene relative to propylene in the gas phase, the propylene partial pressure and the total reactor pressure were reduced as the butene content of the resin increased.

Figure 4:
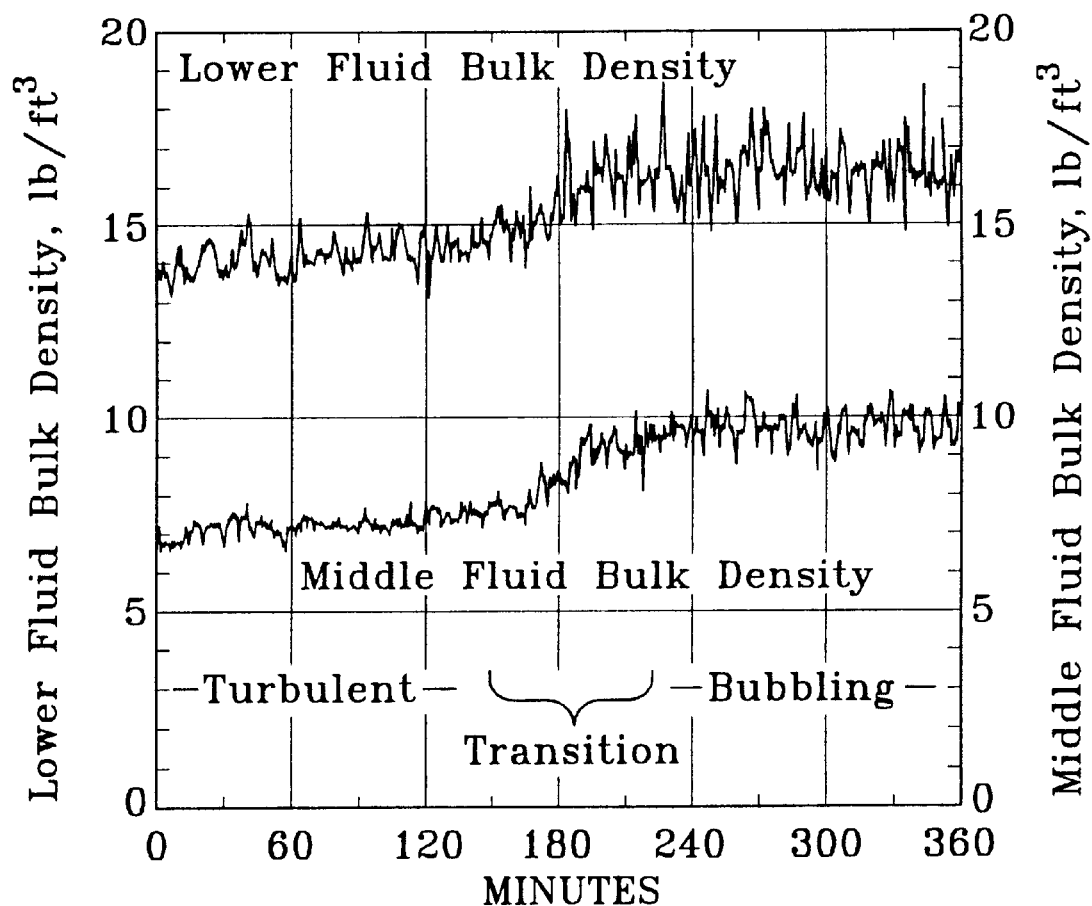
FIG. 4 shows the increase in lower bed fluidized bulk density during the transition from turbulence to bubbling conditions as described in Example 6.

In the course of the transition of the polymerization conditions from the 7 to 12.5 wt % butene product, there was a dramatic change in the middle bed and lower bed fluidized bulk densities as depicted in FIG. 4 corresponding to a switch from turbulent to bubbling fluidization. The lower fluidized bulk density increased from about 14.5 to 16.5 lb/ft$^3$ and also oscillated in a broader band. Note that the bands presented in FIG. 4 were prepared from averaged data and accordingly do not represent the complete magnitude of the band width increase, which was by a factor of about 2 or 3. Nor do the bands depict the real frequency of oscillation which was about 1 or 2 every 4 to 5 seconds. The frequency tended to be slower in the bubbling regime. The superficial gas velocity was about 1.4 feet per second.

Figure 5:
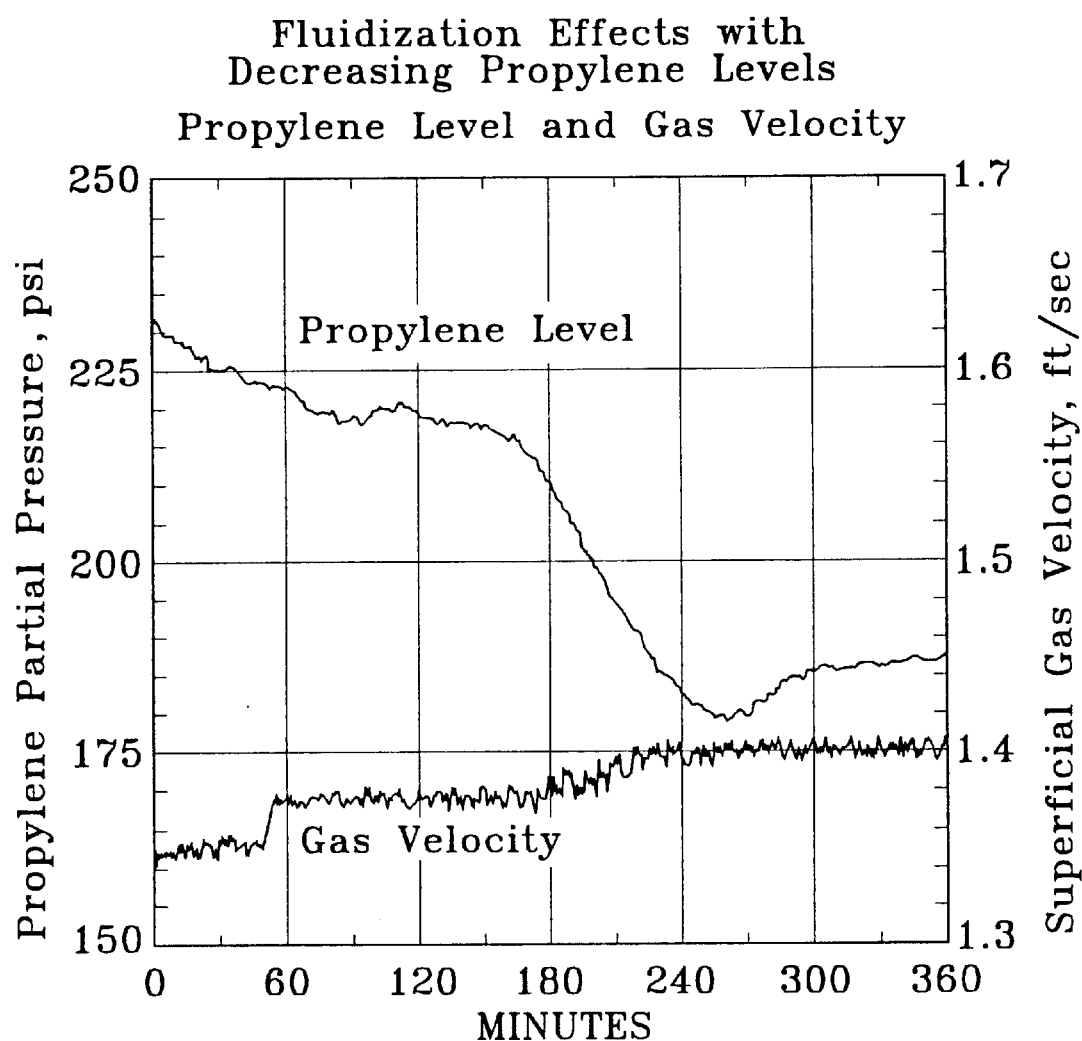
FIG. 5 shows changes in propylene concentration and SGV as recited in Example 6.

The transition from turbulent to bubbling fluidization corresponded to a decrease in the propylene concentration from about 220 to 180 psi as shown in FIG. 5 and a decrease in the total pressure from about 310 to 270 psia. The relative amount of butene to propylene increased at the same time from about a 0.16 to 0.20 $C_4/C_3$ gas molar ratio in the cycle gas. The corresponding change in the cycle gas density was about 0.6 lb/ft$^3$, from about 2.3 lb/ft$^3$ in turbulent fluidization to about 1.7 lb/ft$^3$ in bubbling fluidization. The superficial gas velocity was increased slightly during this time as shown in FIG. 5, yet the bed remained in bubbling fluidization. The resin average particle size increased only slightly during this time from about 0.025 to 0.033 inch, and the resin fines content decreased from about 5 to 3%.

The unanticipated changes in the fluidized bulk density caused the reactor's operators to temporarily increase the reactor total pressure and the propylene partial pressure to about 315 and 270 psi respectively. The $C_4/C_3$ gas mole ratio decreased to about 0.12 and the cycle gas density increased to about 2.8 lb/ft$^3$. The bed returned to a turbulent fluidization mode. The reactor cycle gas composition and pressure were then transitioned back to the values employed for the production of the 12.5 wt % butene random copolymer, and the bed changed back to a bubbling fluidization regime.

Figure 6:
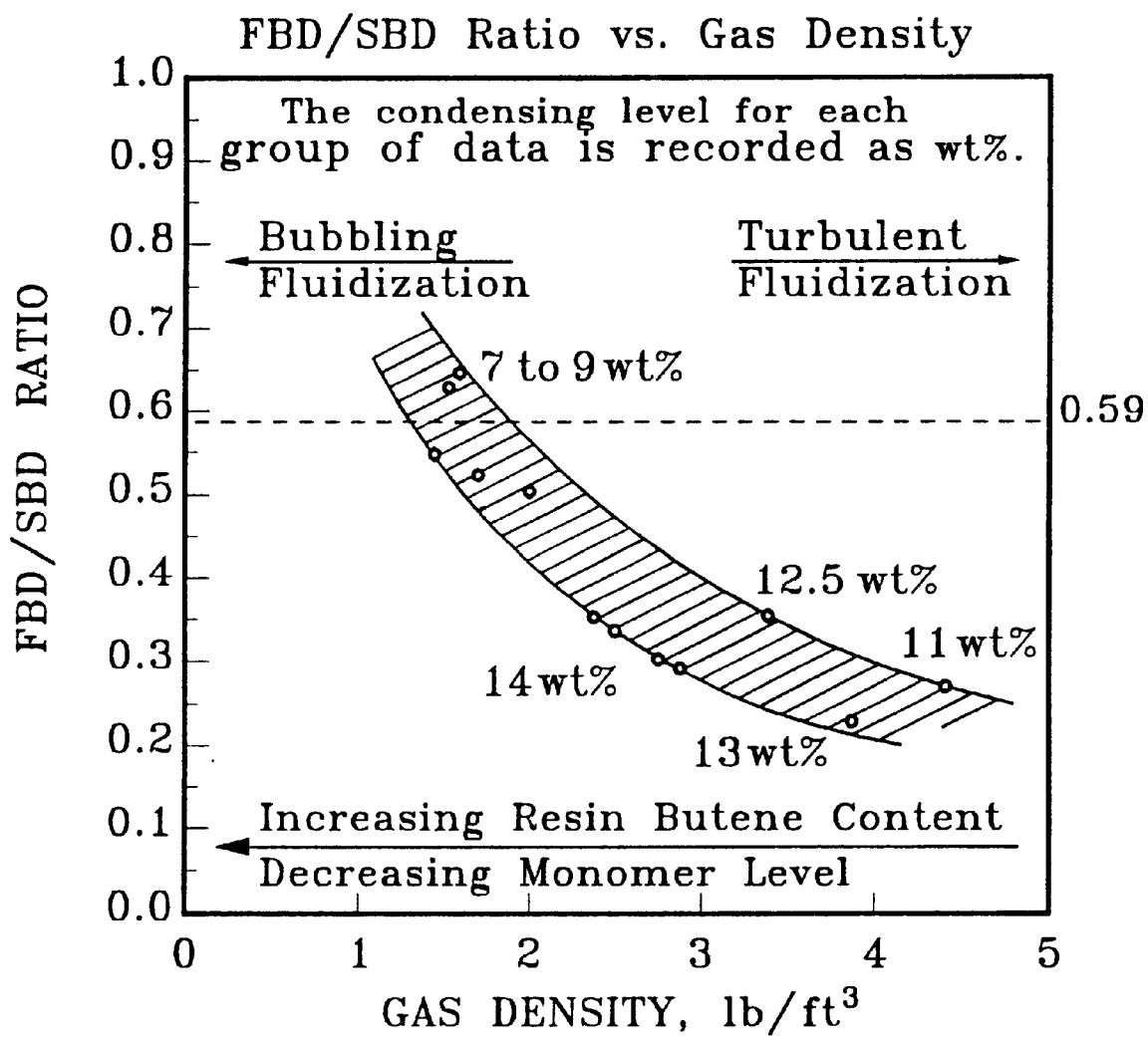
FIG. 6 shows the FBD/SBD ratio through the events of Example 6.

FIG. 6 shows a graph of the FBD/SBD ratio for the butene propylene random copolymers compared to the cycle gas density. It clearly demonstrates that the FBD/SBD ratio for the copolymers containing the lower levels of butene were well below the critical 0.59 FBD/SBD ratio. The corresponding X, Y, and Z bulk density functions were calculated and found to be well within the zone predicted to be inoperable by DeChellis et al in U.S. Pat. No. 5,352,749. Yet, the reactor performed smoothly. The reactor was operated with a condensing level up to 14 wt %. The example demonstrates the transition between turbulent and bubbling fluidization. Besides the effects of the gas density on fluidization behavior, it was observed that increases in the cycle gas dew point, particularly to within about 5 to 7 degrees C. of the bed temperature, appeared at times to cause the middle and lower fluidized bulk density to decrease by about 2 to 3 lb/ft$^3$, but the effect was not always reproducible.

What is claimed is:

1. Method of achieving a high level of liquid in recycle fluid in the operation of a fluidized bed olefin polymerization reactor comprising adjusting conditions in said reactor to pass from a bubbling operating mode with a condensing liquid level in said recycle fluid of less than 17.5 weight percent to a turbulent operating mode, and increasing the liquid level in said recycle fluid to at least 17.5 weight percent.

2. Method of claim 1 wherein said adjusting of conditions includes adjusting the superficial gas velocity to at least 1.01 times $U_c$.

3. Method of claim 2 wherein said adjusting of conditions includes adjusting the superficial gas velocity to at least 1.1 times $U_c$.

4. Method of claim 1 wherein said liquid level in said recycle fluid is increased to at least 17.5 weight percent after achieving said turbulent operating mode.

5. Method of claim 1 wherein the olefin polymerized in said reactor comprises ethylene.

6. Method of claim 1 wherein the olefin polymerized in said reactor comprises propylene.

7. Method of claim 1 wherein the liquid recycled includes hydrocarbons having molecular weights between 42 and 100.

8. Method of claim 1 wherein the recycled liquid includes hydrocarbons having molecular weights between 42 and 60.

9. Method of claim 1 wherein said liquid level is increased to at least 20%.

10. Method of claim 1 wherein said liquid level is increased to at least 25%.

11. Method of claim 1 wherein said liquid level is increased to 30–90%.

12. Method of conducting an exothermic olefin polymerization reaction in a fluidized bed comprising maintaining turbulent conditions therein while removing the heat of reaction by recycling fluid from said fluidized bed, said recycled fluid containing at least 17.5% liquid after cooling and condensing.

13. Method of claim 12 wherein said turbulent conditions include a superficial gas velocity between $1.01 \times U_c$ and $U_k$.

14. Method of claim 12 wherein said turbulent conditions include a superficial gas velocity between $1.1 \times U_c$ and $0.9 \times U_k$.

15. Method of claim 12 wherein said turbulent conditions include a ratio of fluidized bulk density to settled bulk density (FBD/SBD) of less than 0.59.

16. Method of claim 12 wherein the level of liquid in said recycled fluid is greater than 20 weight percent based on the total weight of said recycled fluid.

17. Method of claim 12 wherein the level of liquid in said recycled fluid is in the range of about 30 to 90 weight percent liquid based on the total weight of said recycled fluid.

18. Method of claim 12 wherein said recycled fluid includes about 1 to 90 mole percent of a condensing agent selected from the group consisting of propane, butane, isobutane, pentane, isopentane, hexane, heptane, octane and mixtures thereof.

19. A process for polymerizing alpha-olefins in a gas phase reactor having a fluidized bed and a fluidizing medium wherein the fluidizing medium serves to control the cooling capacity of said reactor, the process comprising employing in the fluidizing medium a level of liquid entering the reactor which is greater than 17.4 weight percent based on the total weight of the fluidizing medium and wherein the superficial gas velocity is at least at the velocity of transition from the bubbling regime to turbulent fluidization and is below the transport velocity, and the ratio of the resin fluidized bulk density to the settled bulk density is less than 0.59.

20. Process of claim 19 wherein the ratio of fluidized bulk density to settled bulk density is from 0.4 to 0.58.

* * * * *